15094582B2" /> -->

United States Patent
Van Der Boon et al.

(10) Patent No.: US 12,054,582 B2
(45) Date of Patent: Aug. 6, 2024

(54) ALKYD RESIN, COATING COMPOSITION, AND SUBSTRATE COATED WITH SUCH COATING COMPOSITION

(71) Applicant: Akzo Nobel Coatings International B.V., Amsterdam (NL)

(72) Inventors: Leonardus Jacobus Petrus Van Der Boon, Amsterdam (NL); Iris Klein Schiphorst, Amsterdam (NL); Aranka Gabriëlla Maria Louisa Van Klink, Amsterdam (NL); Keimpe Jan Van Den Berg, Amsterdam (NL)

(73) Assignee: Akzo Nobel Coatings International B.V., Amsterdam (NL)

( * ) Notice: Subject to any disclaimer, the term of this patent is extended or adjusted under 35 U.S.C. 154(b) by 0 days.

(21) Appl. No.: 18/282,255

(22) PCT Filed: Mar. 16, 2022

(86) PCT No.: PCT/EP2022/056847
§ 371 (c)(1),
(2) Date: Sep. 15, 2023

(87) PCT Pub. No.: WO2022/194945
PCT Pub. Date: Sep. 22, 2022

(65) Prior Publication Data
US 2024/0158572 A1     May 16, 2024

(30) Foreign Application Priority Data

Mar. 17, 2021 (EP) .................................. 21163155

(51) Int. Cl.
| C08G 63/685 | (2006.01) |
| C08G 18/34 | (2006.01) |
| C08G 18/42 | (2006.01) |
| C08G 18/66 | (2006.01) |
| C08G 18/75 | (2006.01) |
| C09D 167/08 | (2006.01) |
| C09D 175/14 | (2006.01) |

(52) U.S. Cl.
CPC ....... *C08G 63/6858* (2013.01); *C08G 18/348* (2013.01); *C08G 18/4288* (2013.01); *C08G 18/6625* (2013.01); *C08G 18/755* (2013.01); *C09D 167/08* (2013.01); *C09D 175/14* (2013.01); *C08G 2150/00* (2013.01)

(58) Field of Classification Search
CPC .................................................. C08G 63/6858
See application file for complete search history.

(56) References Cited

U.S. PATENT DOCUMENTS

| 2,993,021 | A | 7/1961 | Bavley et al. |
| 4,070,370 | A | 1/1978 | Elliott et al. |
| 4,127,493 | A | 11/1978 | Elliott et al. |
| 4,133,785 | A | 1/1979 | Henshaw et al. |
| 5,880,252 | A | 3/1999 | Kim et al. |
| 8,796,472 | B2 | 8/2014 | Wabnitz et al. |
| 9,624,339 | B2 | 4/2017 | Herve et al. |
| 2010/0048812 | A1 | 2/2010 | Hofland et al. |
| 2019/0023839 | A1 | 1/2019 | Miller et al. |

FOREIGN PATENT DOCUMENTS

| CN | 104185647 | 12/2014 |
| CN | 104271634 | 1/2015 |
| CN | 106459391 | 2/2017 |
| CN | 106574018 | 4/2017 |
| EP | 2022781 | 2/2009 |
| WO | 2011148111 | 12/2011 |
| WO | 2015/193493 A1 | 12/2015 |

OTHER PUBLICATIONS

"Office Action," for Chinese Patent Application No. 202280021529.4 mailed Feb. 6, 2024 (11 pages) with English translation.
G.J.Noordzij et al., The Aza-Michael Reaction: Towards Semi-Crystalline Polymers from Renewable Itaconic Acid and Diamines, Polymer Chemistry, vol. 10, No. 29, Jul. 23, 2019, pp. 4049-4058.
European Search Report of Corresponding European Application No. 21163155.1, dated Jul. 23, 2021.
International Search Report of Corresponding International Application No. PCT/EP2022/056847, dated May 16, 2022.
International Preliminary Report on Patentability of Corresponding International Application No. PCT/EP2022/056847, issued Sep. 12, 2023.

*Primary Examiner* — Wenwen Cai
(74) *Attorney, Agent, or Firm* — Pauly, DeVries Smith & Deffner LLC

(57) ABSTRACT

An alkyd resin is provided wherein the alkyd resin is obtainable by polymerization of reaction components comprising a polybasic acid, a polyhydric alcohol, and unsaturated fatty acids, or by further reacting such alkyd resin with a polyurethane prepolymer with emulsifying groups. Also provided are a coating composition comprising such alkyd resin as binder polymer, and a substrate coated with such coating composition.

18 Claims, No Drawings

ALKYD RESIN, COATING COMPOSITION, AND SUBSTRATE COATED WITH SUCH COATING COMPOSITION

CROSS-REFERENCE TO RELATED APPLICATIONS

This application is a 35 U.S.C. § 371 national phase application of PCT Application No. PCT/EP2022/056847 (published as WO 2022/194945 A1), filed on Mar. 16, 2022, which claims priority to EP Application No. 21163155.1, filed on Mar. 17, 2021, each of which is incorporated herein by reference in its entirety.

FIELD OF THE INVENTION

The present invention relates to an alkyd resin obtainable by polymerization of reaction components comprising a polybasic acid, a polyhydric alcohol, and unsaturated fatty acids, or by further reacting such alkyd resin with a polyurethane prepolymer with emulsifying groups, to a coating composition comprising such alkyd resin as binder polymer, and to a substrate coated with such coating composition.

BACKGROUND OF THE INVENTION

Alkyd resins are widely used as binder polymer in coating compositions, in particular in decorative paints. An alkyd resin is a fatty acid functionalized polyester resin that comprises unsaturated fatty acids, such as for example oleic acid, linoleic acid, or linolenic acid. The fatty acid moieties of the alkyd resin react with oxygen from the atmosphere to form hydroperoxides which subsequently decompose to form free radicals. Reaction of these free radicals with the unsaturated carbon-carbon bonds of the fatty acid moieties causes covalent bonds to be formed between the alkyd polymer chains, thus forming cross-links between polymer chains. In this way, a liquid coating composition that comprises alkyd resin hardens to form a solid cured coating. This process is also referred to as auto-oxidation or drying.

Alkyds may be prepared by reacting a polyhydric alcohol, a polybasic acid or its anhydride, and unsaturated fatty acids, typically in the presence of a catalyst, to give an unsaturated fatty acid residue containing polyester. A monocarboxylic acid such as for example benzoic acid is typically added to the reaction mixture as chain stopper.

Alkyd resins are partly derived from biobased material, since the fatty acids are typically obtained from vegetable oil. There is, however, a desire to increase the content of biobased material in binder polymers without compromising the properties of the resulting coating.

SUMMARY OF THE INVENTION

It has now been found that the biobased content of alkyd resins can be increased by replacing part of its acid components for the polyester backbone, i.e. part of the polybasic acid or of the monocarboxylic acid that may be used as chain stopper, by a 1-substituted-5-oxopyrrolidine-3-carboxylic acid that is obtainable by reacting itaconic acid with a primary amine. Itaconic acid is a compound that can be mass-produced by fermentation from glucose, a compound derived from biomass. It has, moreover, been found that if the primary amine comprises an aromatic or non-aromatic cyclic group, the alkyd resin, if used in a coating composition, results in a coating with improved hardness.

Accordingly, the invention provides in a first aspect an alkyd resin obtainable by polymerization of reaction components comprising:
(a) a polybasic acid;
(b) a polyhydric alcohol;
(c) an unsaturated fatty acid comprising in the range of from 12 to 24 carbon atoms; and
(d) optionally a monocarboxylic acid other than an unsaturated fatty acid comprising in the range of from 12 to 24 carbon atoms and other than a polyhydric alcohol,
wherein at least part of the polybasic acid (a) and/or of the monocarboxylic acid (d) is a 1-substituted-5-oxopyrrolidine-3-carboxylic acid obtainable by reacting itaconic acid with a primary amine group of an amine, wherein the amine comprises an aromatic or non-aromatic cyclic group.

In a second aspect, the invention provides a polyurethane-polyester hybrid alkyd resin obtainable by reacting an alkyd resin according to the first aspect of the invention with a polyurethane prepolymer with emulsifying groups.

In a third aspect, the invention provides a coating composition comprising an alkyd resin according to the first or second aspect of the invention as binder polymer.

In a final aspect, the invention provides a substrate coated with a coating composition according to the third aspect of the invention.

DETAILED DESCRIPTION OF THE INVENTION

The alkyd resin according to the invention is an alkyd resin obtainable by the polymerization of reaction components comprising:
(a) a polybasic acid;
(b) a polyhydric alcohol;
(c) an unsaturated fatty acid comprising in the range of from 12 to 24 carbon atoms; and
(d) optionally a monocarboxylic acid other than an unsaturated fatty acid comprising in the range of from 12 to 24 carbon atoms and other than a polyhydric alcohol.

The reaction components (a), (b), and optionally (d) form a polyester backbone by condensation polymerization. Monocarboxylic acid (d) acts as a chain stopper in the polymerization process. The unsaturated fatty acids (c) form fatty acid tails that provide crosslinking capacity through free radical reactions at its unsaturated carbon-carbon bonds.

Polymerization to form alkyd resins is known in the art and may be done by first reacting the polyester backbone components, i.e. a polybasic acid (a), a polyhydric alcohol (b), and optionally a chain stopping monocarboxylic acid (d) such as for example benzoic acid in the presence of a catalyst to form a hydroxy-functional polyester, and then reacting the hydroxy-functional polyester with one or more unsaturated fatty acids (c). Alternatively, polybasic acid (a), polyhydric alcohol (b), unsaturated fatty acid (c), and any chain stopping monocarboxylic acid (d) are reacted in a single step. In a further alternative process, the alkyd resin may be obtained by reacting a polybasic acid (a), a polyhydric alcohol (b), and a triglyceride (often referred to as an oil) comprising unsaturated fatty acid residues with 12 to 24 carbon atoms. The triglyceride then provides the fatty acids (c) by means of transesterification.

Polymerization to form an alkyd resin is carried out at process conditions known in the art, typically at a temperature in the range of from 150 to 240° C.

At least part of polybasic acid (a) and/or of monocarboxylic acid (d) is a 1-substituted-5-oxopyrrolidine-3-carboxylic acid obtainable by reacting itaconic acid with a primary amine group of an amine, wherein the amine comprises an aromatic or non-aromatic cyclic group. Such 1-substituted-5-oxopyrrolidine-3-carboxylic acid is obtainable by an aza-Michael addition reaction between itaconic acid and an amine with a primary amine group followed by a cyclocondensation reaction. By reacting one mole of itaconic acid with one mole of a monoamine, a monocarboxylic 1-substituted-5-oxopyrrolidine-3-carboxylic acid is obtained. By reacting two moles of itaconic acid with one mole of a di-amine with two primary amine groups, a dicarboxylic 1-substituted-5-oxopyrrolidine-3-carboxylic acid is formed, i.e. a 1,1'-substituted bis(5-oxopyrrolidine-3-carboxylic acid). Likewise, three moles of itaconic acid may be reacted with one mole of a tri-amine with three primary amine groups to form a tricarboxylic 1-substituted-5-oxopyrrolidine-3-carboxylic acid.

Polybasic acid (a) may be any polybasic acid known to be suitable as monomer for a hydroxy-functional polyester. Polybasic acid (a) may comprise more than one polybasic acid. Examples of such polybasic acid (a) include phthalic acid, citric acid, fumaric acid, mesaconic acid, maleic acid, citraconic acid, itaconic acid, isophthalic acid, terephthalic acid, 5-tert. butyl isophthalic acid, trimellitic acid, pyromellitic acid, succinic acid, adipic acid, 2,2,4-trimethyl adipic acid, azelaic acid, sebacic acid, dimerized fatty acids, cyclopentane-1,2-dicarboxylic acid, cyclohexane-1,2-dicarboxylic acid, 4-methylcyclohexane-1,2-dicarboxylic acid, tetrahydrophthalic acid, endomethylene-cyclohexane-1,2-dicarboxylic acid, butane-1,2,3,4-tetracarboxylic acid, endoisopropylidene-cyclohexane-1,2-dicarboxylic acid, cyclo-hexane-1,2,4,5-tetracarboxylic acid, butane-1,2,3,4-tetracarboxylic acid, the Diels-Alders adduct of abietic acid and maleic anhydride or fumaric acid, and mixtures of two or more thereof. The polybasic acid (a) may be in the form of its anhydride or in the form of an ester. If the polybasic acid (a) is in the form of an ester, it is preferably in the form of an ester of the polybasic acid with an alcohol having one to four carbon atoms. Preferably, polybasic acid (a) is in the form of an acid or its anhydride. Preferably, polybasic acid (a) has up to 60 carbon atoms, more preferably up to 40 carbon atoms. More preferably, polybasic acid (a) comprises phthalic acid or phthalic acid anhydride.

In one embodiment (second embodiment as described in further detail below), the polybasic acid (a) comprises a 1-substituted-5-oxopyrrolidine-3-carboxylic acid obtainable by reacting itaconic acid with a polyamine selected from the group consisting of a di-amine comprising two primary amine groups and an aromatic or non-aromatic cyclic group and a tri-amine comprising three primary amine groups and an aromatic or non-aromatic cyclic group.

Polyhydric alcohol (b) may be any polyhydric alcohol known to be suitable as monomer for a hydroxy-functional polyester. Polyhydric alcohol (b) may comprise more than one polyhydric alcohol. Examples of such polyhydric alcohol (b) include ethylene glycol, 1,3-propane diol, 1,6-hexane diol, 1,12-dodecane diol, 3-methyl-1,5-pentane diol, 2,2,4-trimethyl-1,6-hexane diol, 2,2-dimethyl-1,3-propane diol, 2-methyl-2-cyclohexyl-1,3-propane diol, dimethylol propanoic acid, glycerol, trimethylol ethane, trimethylol propane, pentaerythritol, sorbitol, isosorbide, dimer fatty acid based diols such as Pripol 2033, etherification products of such polyhydric alcohols such as ditrimethylol propane and di-, tri-, and tetrapentaerythritol, and mixtures of two or more thereof. Preferably, polyhydric alcohol (b) is selected from the group consisting of pentaerythritol, trimethylol propane, glycerol, and any combination of two or more thereof. Since a hydroxy-functional polyester is to be formed, polyhydric alcohol (b) has on average more than two hydroxyl groups. The polyhydric alcohol (b) may be a mixture of a polyhydric alcohol (b) with two hydroxyl functional groups and a polyhydric alcohol (b) with more than two hydroxyl groups. Preferably, polyhydric alcohol (b) has up to 60 carbon atoms, more preferably up to 40 carbon atoms.

Additional to polybasic acid (a) and polyhydric alcohol (b), the reaction components may comprise a hydroxy monocarboxylic acid as chain extender, such as for example lactic acid.

Component (c) may be any unsaturated fatty acid comprising in the range of 12 to 24 carbon atoms or a mixture of two or more thereof. Reference herein to an unsaturated fatty acid is to a monocarboxylic acid with an unsaturated linear (non-cyclic) aliphatic hydrocarbon tail. The hydrocarbon tail may be substituted with a hydroxyl or a carbonyl group, preferably at most one hydroxyl or carbonyl group, such as for example in ricinoleic acid, licanic acid, or hydroxystearic acid. It is preferred that the hydrocarbon tail is unsubstituted (only carbon and hydrogen atoms). Examples of suitable unsaturated fatty acids include ethylenically unsaturated conjugated or non-conjugated C12-C24 carboxylic acids, such as myristoleic acid, palm itoleic acid, arachidonic acid, erucic acid, gadoleic acid, clupanadonic acid, oleic acid, ricinoleic acid, linoleic acid, linolenic acid, licanic acid, nisinic acid, eleostearic acid, and mixtures of two or more thereof. The fatty acid (c) may suitably be in the form of a mixture of fatty acids derived from natural or synthetic oils. The fatty acid (c) may be provided as a triglyceride. Preferably, the fatty acid (c) is a mixture of fatty acids derived from soybean oil, palm oil, linseed oil, tung oil, rapeseed oil, sunflower oil, calendula oil, wood oil, tallow oil, (dehydrated) castor oil, safflower oil, tuna fish oil, coconut oil, dehydrated coconut oil, or a combination thereof. Preferably, fatty acid (c) is a mixture of fatty acids derived from sunflower oil or soybean oil, such as a mixture of oleic acid, linoleic acid, and alpha-linolenic acid.

Preferably, a monocarboxylic acid (d) other than an unsaturated fatty acid comprising in the range of from 12 to 24 carbon atoms and other than a polyhydric alcohol is comprised in the reaction components from which the alkyd resin is obtained by polymerization. Examples of suitable monocarboxylic acids (d) include pivalic acid, 2-ethylhexanoic acid, 4-(2-methyl-2-propanyl)benzoic acid, cyclopentanecarboxylic acid, naphthenic acid, cyclohexanecarboxylic acid, 2,4-dimethylbenzoic acid, 2-methylbenzoic acid, benzoic acid, tetrahydrobenzoic acid, and hydrogenated or non-hydrogenated abietic acid.

At least part of polybasic acid (a) and/or of monocarboxylic acid (d) is a 1-substituted-5-oxopyrrolidine-3-carboxylic acid obtainable by reacting itaconic acid with a primary amine group of an amine comprising a primary amine group and an aromatic or non-aromatic cyclic group.

Preparation of 1-substituted-5-oxopyrrolidine-3-carboxylic acid from itaconic acid and a primary amine is known in the art and for example described in G. J. Noordzij et al., *Polym. Chem.*, 2019, 10, p. 4049-4058.

In a first embodiment, the reaction components from which the alkyd resin is obtained by polymerization comprise a monocarboxylic acid (d), wherein the monocarboxylic acid (d) comprises or consists of a 1-substituted-5-oxopyrrolidine-3-carboxylic acid obtainable by reacting itaconic acid with a monoamine comprising a primary amine group and an aromatic or non-aromatic cyclic group. The monoamine may have more than one aromatic or non-aromatic cyclic group, preferably in the range of from 1 to 3 cyclic groups, more preferably it has one cyclic group. The monoamine preferably has no heteroatoms other than the nitrogen atom of the primary amine group. The monoamine preferably comprises in the range of from 4 to 16 carbon atoms.

Examples of preferred monoamines with one non-aromatic cyclic group are cyclohexylamine, cyclopentylamine, cycloheptylamine, cyclobutylamine, methylcyclohexylamine, and 2-ethylcyclohexylamine. Examples of preferred monoamines with one aromatic cyclic group are aniline, trimethylaniline, dimethylaniline, toluidine, ethylaniline, isopropylaniline, butylaniline, and methylbenzylamine. Examples of preferred monoamines with more than one aromatic cyclic group are aminobiphenyl and alkyl-substituted aminobiphenyl such as 4-amino-4'-methylbiphenyl, 2',3-dimethyl-4-aminobiphenyl, 3,3'-dimethyl-4-aminobiphenyl, aminonaphthalene, aminoanthracene, phenanthrenamine, and aminomethyl naphthalene.

Aniline and cyclohexylamine are particularly preferred monoamines.

Preferably, monocarboxylic acid (d) consists of the 1-substituted-5-oxopyrrolidine-3-carboxylic acid obtainable by reacting itaconic acid with a monoamine comprising a primary amine group and an aromatic or non-aromatic cyclic group. This implies that the reaction components from which the alkyd resin is polymerized do not comprise a monocarboxylic acid other than unsaturated fatty acid (c) and are thus free of any monocarboxylic acids typically used as chain stopper, such as for example benzoic acid.

Based on the total moles of reaction components (a), (b) and (d), i.e. the components forming the polyester backbone of the alkyd resin, the amount of 1-substituted-5-oxopyrrolidine-3-carboxylic acid obtainable by reacting itaconic acid with a monoamine comprising a primary amine group and an aromatic or non-aromatic cyclic group is preferably in the range of from 1 to 40 mol. %.

In a second embodiment, the polybasic acid (a) comprises a 1-substituted-5-oxopyrrolidine-3-carboxylic acid obtainable by reacting itaconic acid with a di-amine or triamine comprising two or three primary amine groups, respectively, and an aromatic or non-aromatic cyclic group, preferably obtainable by reacting itaconic acid with a diamine.

The di-amine or triamine may have more than one aromatic or non-aromatic cyclic group, preferably has in the range of from 1 to 4 cyclic groups, more preferably has two cyclic groups. The di-amine or triamine preferably has no heteroatoms other than the nitrogen atoms of the primary amine groups. The di-amine or triamine preferably comprises in the range of from 6 to 20 carbon atoms.

Examples of suitable di-amines with one cyclic group include phenylenediamine, diaminotoluene, cyclohexanediamine, 1-(aminomethyl)cyclohexan-1-amine, [2-(aminomethyl)cyclobutyl]methanamine, 1,2-cyclohexanediamine, and isophorone diamine. Examples of suitable di-amines with two cyclic groups include substituted and unsubstituted diaminodiphenylalkanes and diaminodicyclohexylalkanes, benzidine, 2,2'-biphenyldiamine, 4,4'-ethylenedianiline, 4,4'-methylenebis(2-methylaniline), 2,4'-methylenedianiline, and 3,4'-diaminobiphenyl.

Examples of suitable tri-amines include trisaminoethylamine, triaminotoluene, and triaminobenzene.

Preferably, the polyamine is a di-amine, more preferably a diaminodiphenylalkane or a diaminodicyclohexylalkane, even more preferably a diaminodiphenylalkane or a diaminodicyclohexylalkane wherein the alkane group comprises in the range of from 1 to 4 carbon atoms. Particularly preferred di-amines are 4,4'-methylenedianiline and 4,4'-methylenebis(4,4'-cyclohexylamine).

In the second embodiment, preferably only part of the polybasic acid (a) is a 1-substituted-5-oxopyrrolidine-3-carboxylic acid. More preferably, in the range of from 5 to 40 mol. % of the polybasic acid (a) is the 1-substituted-5-oxopyrrolidine-3-carboxylic acid obtainable by reacting itaconic acid with the di-amine or triamine, even more preferably in the range of from 10 to 30 mol. %.

The first and the second embodiments may be combined in the sense that at least part of the polybasic acid (a) is a 1-substituted-5-oxopyrrolidine-3-carboxylic acid as specified hereinabove and at least part of the monocarboxylic acid (d) is a 1-substituted-5-oxopyrrolidine-3-carboxylic acid as specified hereinabove.

A particular preferred alkyd resin is an alkyd resin wherein the polybasic acid (a) comprises phthalic anhydride, the polyhydric alcohol (b) is pentaerythritol, and the fatty acid (c) is a mixture of fatty acids derived from soybean oil.

The alkyd resin may be a polyester-urethane hybrid alkyd resin with both ester and urethane linkages in its polymer chain. Such hybrid alkyd resin may for example be prepared by co-polymerizing a polyurethane prepolymer with emulsifying groups with reaction components (a), (b), (c), and optionally (d). The reaction components then further comprise (e) a polyurethane prepolymer with emulsifying groups. The emulsifying groups may be non-ionic or ionic emulsifying groups, such as polyether groups, carboxyl, sulphonate or phosphonate groups. Preferably the emulsifying groups are carboxylic groups. Polyurethane prepolymer with emulsifying groups suitable for preparing polyester-urethane hybrid alkyd resins are well known in the art and typically are the reaction product of a polyisocyanate with a dibasic alcohol having an emulsifying group, such as for example dimethylolpropionic acid (DMPA). Suitable polyisocyanates are known in the art and include di-isocyanates, such as 1,6-hexane diisocyanate, isophorone diisocyanate, toluene diisocyanate, diphenyl diisocyanate, and dicyclohexylmethane di-isocyanate, and tri-isocyanates.

Instead of copolymerizing a polyurethane prepolymer with emulsifying groups with reaction components (a), (b), (c), and optionally (d), a polyester-urethane hybrid alkyd resin according to the present disclosure may be prepared by reacting the alkyd resin obtainable by polymerization of reaction components (a), (b), (c), and optionally (d) with a polyurethane prepolymer with emulsifying groups. The polyurethane prepolymer with emulsifying groups is as component (e) described above.

Preferably, the alkyd resin or the polyurethane-polyester hybrid alkyd resin has an oil length in the range of from 20 to 60%, more preferably of from 25 to 50%. Reference herein to oil length is to the weight percentage of oil (triglyceride) used to provide the fatty acids tails of the alkyd resin based on the total weight of alkyd resin solids or, in case fatty acids are used to provide the fatty acids tails of the alkyd resin, to 1.1 times the weight percentage of fatty acids used.

The alkyd resin preferably has a number averaged molecular weight in the range of from 1,000 to 10,000 g/mol, more preferably of from 1,500 to 5,000 g/mol, even more preferably of from 2,000 to 4,000 g/mol. Preferably, the alkyd resin has a polydispersity index (ratio of weight average molecular weight to number average molecular weight) in the range of from 2 to 20, more preferably of from 2 to 10, even more preferably of from 2 to 6. The number average molecular weight and the weight average molecular weight are determined by gel permeation chromatography using polystyrene standards according to ISO 16014.

Preferably the alkyd resin has an acid value in the range of from 1 to 20 mg KOH/g alkyd. Reference herein to the acid value is to the acid value as determined by Method A in ISO 2114.

In a third aspect, the invention provides a coating composition comprising an alkyd resin according to the first or second aspect of the invention as binder polymer. The coating composition is a liquid coating composition. It may be a solvent-based composition wherein alkyd resin dissolved in an organic solvent provides a continuous liquid phase. It may be a solvent-free coating composition wherein the liquid alkyd resin provides a continuous phase, or it may be an aqueous coating composition wherein alkyd resin is dispersed in a continuous aqueous phase. In view of its relatively high viscosity, the alkyd resin is preferably used as binder polymer in an aqueous coating composition, wherein the alkyd resin is dispersed in a continuous aqueous phase.

The terms emulsion and dispersion (or emulsified and dispersed) in relation to resins are used herein interchangeably.

The coating composition may comprise the alkyd resin in any suitable amount. For solvent-based coating compositions, the concentration of the alkyd resin is typically in the range of from 20 wt % to 95 wt % alkyd resin based on the total weight of the coating composition. In solvent-free coating compositions wherein the liquid alkyd resin provides a continuous phase, the concentration of the alkyd resin typically is in the range of from more than 95 wt % to 99.5 or even 100 wt %. For water-based coating compositions, the concentration of the alkyd resin is typically in the range of from 20 to 70 wt %, preferably of from 25 to 60 wt %.

The coating composition may further comprise any ingredients commonly used in alkyd-based coating compositions, in particular decorative paints. Such ingredients include for example one or more of color pigments, extenders, thickeners, siccatives (drying catalyst), and anti-skinning agents.

The coating composition may comprise one or more additives. Any additives known to be suitable for coating compositions with autoxidizable binders such as alkyds may be used. Examples of suitable additives include UV stabilizers, dispersants, surfactants, anti-static agents, flame-retardant agents, anti-foaming agents, plasticizers, and anti-freezing agents. The total amount of additives will usually be in the range of from 0.1 to 5 wt %, based on the total weight of the coating composition, preferably in the range of from 0.5 to 3 wt %.

The coating composition may be a colored paint or a may be a base paint that may be tinted in the desired color by adding one or more colorants.

The coating composition according to the invention may for example be used as a primer, a topcoat, a high-gloss or a matt coating, a wood coating, a wall paint or a flooring paint. The coating composition may suitably be used to coat any suitable substrate, such as for example wood, wood-based substrates (e.g. fibreboard, chipboard), metal, mineral substrates (e.g. stone, plaster, concrete, masonry, cement, gypsum), plastic substrates, fibre-based substrates, ceramic substrates such as glass, asphalt, leather, paper.

In a fourth aspect, the invention provides a substrate coated with a coating composition according to the third aspect of the invention. The coating composition may be applied to the substrate by any suitable method known in the art, such as for example brushing, dipping, spraying, or roller coating.

The invention is further illustrated by means of the following non-limiting examples.

EXAMPLES

Example 1—Preparation of 1-Substituted-5-Oxopyrrolidine-3-Carboxylic Acids

Three different monocarboxylic 1-substituted-5-oxopyrrolidine-3-carboxylic acids were prepared as follows. To 1 mole of itaconic acid dissolved or suspended in water at 0° C. was dropwise added 1 mole of monoamine. The mixture was reacted at a temperature of 100-110° C., whilst removing water using a Dean-Stark water separator. The resulting material was purified to obtain the monocarboxylic 1-substituted-5-oxopyrrolidine-3-carboxylic acid with a purity of at least 95% as determined by $^1$H-NMR. In Table 1 is shown the monoamine used for each of the monocarboxylic 1-substituted-5-oxopyrrolidine-3-carboxylic acids prepared.

Dicarboxylic 1,1'-substituted-5-oxopyrrolidine-3-carboxylic acid was prepared by suspending 1 mole of 4,4'-diaminodiphenylmethane and 2 moles of itaconic acid in xylene and heating the suspension to 141° C. After 45 minutes, the formation of solids was observed, and the reaction mixture was cooled to room temperature. The solid material was removed from the reaction mixture, crushed to a powder, and added again to the reaction mixture. The reaction was continued at 141° C. for 12 hours, whilst removing water by azeotropic distillation. The resulting mixture was then filtered, washed with water and dried overnight in a vacuum oven at 120° C. to obtain an off-white powder.

TABLE 1

| Monocarboxylic 1-substituted-5-oxopyrrolidine-3-carboxylic acids | |
|---|---|
| 1-substituted-5-oxopyrrolidine-3-carboxylic acid formed | Monoamine |
| 1-phenyl-5-oxopyrrolidine-3-carboxylic acid | aniline |
| 1-cyclohexyl-5-oxopyrrolidine-3-carboxylic acid | cyclohexylamine |
| 1-nhexyl-5-oxopyrrolidine-3-carboxylic acid | n-hexylamine |

Example 2—Preparation of Alkyd Resins

Comparative alkyd resin A (no 1-substituted-5-oxopyrrolidine-3-carboxylic acid) was prepared by charging reaction components (a) to (d) and FASCAT 4100 catalyst (butylstannoic acid) to a reflux reactor equipped with a stirrer and a Dean-Stark water separator in the amounts as indicated in Table 2. After purging with nitrogen, the reactor was heated to 220° C. Xylene was added until a stable reflux was obtained, and water was removed by azeotropic distillation. The reaction was continued until an acid value of 10 mg KOH/g polymer was obtained. The reaction mixture was then cooled to 200° C. and xylene was removed by vacuum distillation. The clear liquid thus obtained was cooled to room temperature.

Alkyd resins I to V were prepared by reacting components (a) to (d) in the presence of a catalyst (FASCAT 4100) as described above for alkyd resin A, except that the clear liquid obtained after removal of xylene was cooled to 80° C.

and then diluted with methyl ethyl ketone (MEK) to obtain alkyd resin dissolved in MEK. The solution was then further cooled to room temperature.

Alkyd resins I to III and V are inventive alkyd resins; alkyd resin IV is a comparative alkyd resin (no cyclic group in the 1-substituted-5-oxopyrrolidine-3-carboxylic acid used).

TABLE 2

Preparation and properties of alkyd resins A and I to V. Amounts of ingredients in grams.

|     |                                                                       | A*     | I      | II     | III    | IV*    | V      |
|-----|-----------------------------------------------------------------------|--------|--------|--------|--------|--------|--------|
| (c) | fatty acids derived from soybean oil (Nouracid SE30)                  | 647    | 898    | 629    | 625    | 235    | 237    |
| (a) | phthalic anhydride                                                    | 553    | 583    | 477    | 470    | 177    | 138    |
| (a) | 1,1'-(methylenebis(4,1-phenylene))bis(5-oxopyrrolidine-3-carboxylic acid) |        |        |        |        |        | 102    |
| (b) | pentaerythritol                                                       | 506    | 533    | 435    | 429    | 161    | 165    |
| (d) | benzoic acid                                                          | 393    |        |        |        |        | 122    |
| (d) | 1-phenyl-5-oxopyrrolidine-3-carboxylic acid                           |        | 487    | 472    |        |        |        |
| (d) | 1-cyclohexyl-5-oxopyrrolidine-3-carboxylic acid                       |        |        |        | 474    |        |        |
| (d) | 1-nhexyl-5-oxopyrrolidine-3-carboxylic acid                           |        |        |        |        | 180    |        |
|     | Catalyst (Fascat4100)                                                 | 1.05   | 1.25   | 1.01   | 1.00   | 0.38   | 0.48   |
|     | Acid value (mg KOH/g polymer)                                         | 9.5    | 9.0    | 9.5    | 9.2    | 10     | 9.8    |
|     | OH-value (mg KOH/g polymer)                                           | 60     | 61     | 64     | 69     | 70     | 72     |
|     | Solids content$^a$                                                    | 99.7   | 80.0   | 81.8   | 79.5   | 70.0   | 79.2   |
|     | Mn (g/mol)                                                            | 3,032  | 2,982  | 3,348  | 2,601  | 3,339  | 3,074  |
|     | Mw (g/mol)                                                            | 17,691 | 14,750 | 13,251 | 14,561 | 11,247 | 52,341 |
|     | Oil length (%)                                                        | 35     | 40     | 35     | 35     | 35     | 35     |

*comparison example
$^a$solvent content of the solid alkyd resin (Alkyd resin A) or the solution of alkyd resin in MEK (alkyd resins I, II, III, IV, and V)

Example 3—Preparation of Alkyd Emulsions

An alkyd emulsion was prepared from alkyd resin A as follows: Alkyd resin A was charged to a glass reactor equipped with a triple blade turbine stirrer and heated to 90° C. while stirring at 900 rpm. Surfactants were added and stirring was continued for 30 minutes. Sodium hydroxide (as a 5M aqueous solution) was added to neutralize 95% of the residual carboxylic groups, the temperature was decreased to 75° C., and stirring was continued for another 30 minutes. Water was then dosed over 120 minutes and the resulting emulsion was cooled to room temperature whilst stirring at 300 rpm.

Alkyd emulsions were prepared from alkyd resins I to V as follows: The solution of alkyd resin in MEK prepared as described in EXAMPLE 2 was charged to a glass reactor equipped with a triple blade turbine stirrer and heated to 30-50° C. while stirring at 300 rpm. Surfactants were added and stirring was continued for 30 minutes. Sodium hydroxide (as a 5M aqueous solution) was added to neutralize 95% of the residual carboxylic groups and stirring was continued for another 30 minutes at 40-50° C. Water was then dosed for 120 minutes while stirring at 300 rpm. MEK was then removed using a rotary evaporator at 40-50° C.

In Table 3, the ingredients used (in weight parts; alkyd resin as solid alkyd) and the pH, particle size and solids content of the resulting alkyd emulsions are shown.

|                     | A*   | I    | II   | III  | IV*  | V    |
|---------------------|------|------|------|------|------|------|
| Alkyd resin A*      | 400  |      |      |      |      |      |
| Alkyd resin I       |      | 500  |      |      |      |      |
| Alkyd resin II      |      |      | 489  |      |      |      |
| Alkyd resin III     |      |      |      | 500  |      |      |
| Alkyd resin IV*     |      |      |      |      | 510  |      |
| Alkyd resin V       |      |      |      |      |      | 505  |
| Anionic surfactant  | 18.4 | 18.5 | 18.5 | 18.4 | 18.5 | 18.5 |
| Nonionic surfactant | 16.2 | 16.2 | 16.2 | 16.1 | 16.2 | 16.2 |
| NaOH solution (5M)  | 12.0 | 12.0 | 12.9 | 12.0 | 14.1 | 13.2 |
| water               | 415  | 416  | 415  | 415  | 415  | 416  |
| pH                  | 7.8  | 7.1  | 6.8  | 7.1  | 7.9  | 8.1  |
| Particle size (nm)  | 214  | 362  | 330  | 324  | 422  | 224  |
| Solids content (%)  | 49.9 | 57.7 | 55.8 | 49.3 | 51.2 | 48.2 |

*comparison example

Example 4—Coating Compositions (Paints)

Coating compositions (base white paints and base clear paints) were prepared with the alkyd emulsions prepared in EXAMPLE 3.

For the base white paints, a titanium dioxide paste was prepared from 21.56 weight parts of titanium dioxide, 0.56 weight parts dispersing agent, 0.08 weight parts anti-foaming agent, and 5.55 weight parts water. To the titanium dioxide paste thus prepared were added under stirring, alkyd emulsion, drying catalyst (Borchi OxyCoat), water, thickener, and wetting agent in the weight parts as indicated in Table 4. Ammonia was then added and further water and further thickener in such amounts to obtain the desired viscosity.

For the base clear paints, alkyd emulsion, water, drying catalyst (Borchi OxyCoat), and wetting agent were mixed in the weight parts as indicated in Table 5. Ammonia was then added and further water and further thickener in such amounts to obtain the desired viscosity.

The hardness (Konig hardness) of coatings formed from the white and clear base paints was determined using the pendulum damping test according to ISO 1522:2006.

A glass panel was coated with a 100 μm wet film using a drawdown bar, held at 23° C. and 50% relative humidity and the hardness development in time was monitored with a Konig pendulum. The number of oscillations needed to reduce from an initial deflection of 6° to a deflection of 3° was measured. The average of duplicate measurement was recorded. The Konig hardness was measured after 1 day, after 7 days, and after 28 days storage at 23° C. and 50% relative humidity.

TABLE 4

Base white paints - weight parts of ingredients and hardness

| | BW A* | BW I | BW II | BW III | BW IV* | BW V |
|---|---|---|---|---|---|---|
| Titanium dioxide paste | 27.75 | 27.75 | 27.75 | 27.75 | 27.75 | 27.75 |
| Emulsion A | 52.30 | | | | | |
| Emulsion I | | 52.30 | | | | |
| Emulsion II | | | 46.86 | | | |
| Emulsion III | | | | 53.04 | | |
| Emulsion IV | | | | | 51.07 | |
| Emulsion V | | | | | | 54.25 |
| Drying catalyst | 0.07 | 0.07 | 0.07 | 0.07 | 0.07 | 0.07 |
| Water | 12.43 | 12.43 | 17.87 | 11.69 | 13.66 | 10.48 |
| Thickener | 3.09 | 3.00 | 3.10 | 3.12 | 3.00 | 3.00 |
| Wetting agent | 0.20 | 0.20 | 0.20 | 0.20 | 0.20 | 0.20 |
| Ammonia (25%) | 0.19 | 0.23 | 0.31 | 0.20 | 0.06 | 0.02 |
| Water | 2.00 | 2.00 | 2.00 | 2.00 | 2.00 | 2.00 |
| Thickener | 3.50 | 3.08 | 3.04 | 2.43 | 1.20 | 1.09 |
| Konig hardness 1 day | 18 | 19 | 28 | 25 | 10 | 20 |
| Konig hardness 7 days | 24 | 24 | 33 | 30 | 11 | 20 |
| Konig hardness 28 days | 35 | 29 | 42 | 42 | 13 | 27 |

*comparison example

TABLE 5

Base clear paints - weight parts of ingredients and hardness

| | BC A* | BC I | BC II | BC III | BC IV* | BC V |
|---|---|---|---|---|---|---|
| Emulsion A | 72.00 | | | | | |
| Emulsion I | | 72.00 | | | | |
| Emulsion II | | | 64.52 | | | |
| Emulsion III | | | | 73.02 | | |
| Emulsion IV | | | | | 70.31 | |
| Emulsion V | | | | | | 74.69 |
| Drying catalyst | 0.25 | 0.25 | 0.25 | 0.25 | 0.25 | 0.25 |
| Water | 23.37 | 23.37 | 30.85 | 22.35 | 25.06 | 20.68 |
| Wetting agent | 0.13 | 0.13 | 0.13 | 0.13 | 0.13 | 0.13 |
| Ammonia (25%) | 0.33 | 0.40 | 0.40 | 0.37 | 0.12 | 0.05 |
| Water | 2.00 | 2.00 | 2.00 | 2.00 | 2.00 | 2.00 |
| Thickener | 9.64 | 9.37 | 10.00 | 8.91 | 7.39 | 6.30 |
| Konig hardness 1 day | 12 | 15 | 14 | 21 | 9 | 24 |
| Konig hardness 7 days | 15 | 20 | 15 | 24 | 10 | 28 |
| Konig hardness 28 days | 24 | 22 | 19 | 29 | 11 | 31 |

*comparison example

Example 5—Coating Compositions (Paints)

Base white paints and base clear paints were prepared with the alkyd emulsions A, I, II, III, and V prepared in EXAMPLE 3, in the same way as in EXAMPLE 4, except that an equal amount of thickener was used in all paints. In Tables 6 and 7, the ingredients and hardness results of the base white paints and base clear paints are shown.

From the results in Tables 4 and 5, it can be seen that replacement of benzoic acid by a 1-substituted-5-oxopyrrolidine-3-carboxylic acid as chain stopping monocarboxylic acid (d) results in an alkyd that provides a coating with comparable or improved hardness, if the 1-substituent has an aromatic or non-aromatic cyclic group. Even if the oil length of the alkyd is increased to 40% (BW I and BC I), an acceptable hardness is obtained, comparable with the hardness obtained using a conventional alkyd with a lower oil length (BW A and BC A; oil length of 35%).

A 1-substituted-5-oxopyrrolidine-3-carboxylic acid with a non-cyclic 1-substituent (BW IV and BC IV; n-hexyl as 1-substituent) results in decreased hardness of the resulting paints.

Replacement of part of phthalic acid by 1,1'-(methylenebis(4,1-phenylene))bis(5-oxopyrrolidine-3-carboxylic acid), also results in an alkyd that provides a coating with comparable or improved hardness (compare BW A and BC A with BW V and BC V).

As can be seen from Tables 6 and 7, also when the amount of thickener in the coating compositions is kept constant, the same effects of the 1-substituted-5-oxopyrrolidine-3-carboxylic acids is seen.

TABLE 6

Base white paints - weight parts of ingredients and hardness

| | BW A* | BW I | BW II | BW III | BW V |
|---|---|---|---|---|---|
| Titanium dioxide paste | 27.75 | 27.75 | 27.75 | 27.75 | 27.75 |
| Emulsion A | 52.30 | | | | |
| Emulsion I | | 52.30 | | | |
| Emulsion II | | | 46.86 | | |
| Emulsion III | | | | 53.04 | |
| Emulsion V | | | | | 54.25 |
| Drying catalyst | 0.07 | 0.07 | 0.07 | 0.07 | 0.07 |
| Water | 12.43 | 12.20 | 8.82 | 11.46 | 10.25 |
| Thickener | 3.00 | 3.00 | 3.00 | 3.00 | 3.00 |
| Wetting agent | 0.20 | 0.20 | 0.20 | 0.20 | 0.20 |
| Ammonia (25%) | 0.17 | 0.22 | 0.24 | 0.10 | 0.02 |
| Water | 2.00 | 2.00 | 2.00 | 2.00 | 2.00 |
| Thickener | 2.23 | 2.23 | 2.23 | 2.23 | 2.23 |
| Konig hardness 1 day | 18 | 19 | 25 | 24 | 22 |
| Konig hardness 7 days | 21 | 23 | 27 | 28 | 25 |
| Konig hardness 28 days | 29 | 30 | 35 | 40 | 33 |

*comparison example

TABLE 7

Base clear paints - weight parts of ingredients and hardness

| | BC A* | BC I | BC II | BC III | BC V |
|---|---|---|---|---|---|
| Emulsion A | 72.00 | | | | |
| Emulsion I | | 72.00 | | | |
| Emulsion II | | | 64.52 | | |
| Emulsion III | | | | 73.02 | |
| Emulsion V | | | | | 74.69 |
| Drying catalyst | 0.25 | 0.25 | 0.25 | 0.25 | 0.25 |
| Water | 18.17 | 18.17 | 25.66 | 17.14 | 15.48 |
| Wetting agent | 0.13 | 0.13 | 0.14 | 0.13 | 0.13 |
| Ammonia (25%) | 0.28 | 0.37 | 0.44 | 0.30 | 0.02 |
| Water | 2.00 | 2.00 | 2.00 | 2.00 | 2.00 |
| Thickener | 7.20 | 7.20 | 7.20 | 7.20 | 7.20 |
| König hardness 1 day | 13 | 16 | 19 | 21 | 19 |
| König hardness 7 days | 16 | 18 | 19 | 25 | 23 |
| König hardness 28 days | 23 | 22 | 25 | 33 | 29 |

*comparison example

Example 6—Preparation of Alkyd Resins (Polyester-Urethane Hybrid Alkyd Resins)

An intermediate alkyd resin VI was prepared by charging 478 grams Nouracid SE30 as component (c), 231 grams phthalic acid and 8 grams maleic acid as component (a), 311 grams pentaerythritol as component (b), and 369 grams 1-phenyl-5-oxopyrrolidine-3-carboxylic acid as component (d) to a reflux reactor equipped with a stirrer and a Dean-Stark water separator. After purging with nitrogen, the reactor was heated to 220° C. Xylene was added until a stable reflux was obtained, and water was removed by azeotropic distillation. The reaction was continued until an acid value of 3 mg KOH/g polymer was obtained. The reaction mixture was then cooled to 80° C. and diluted with methyl ethyl ketone (MEK) to obtain alkyd resin dissolved in MEK (85% solids content). The solution was then further cooled to room temperature.

An intermediate alkyd resin VII was prepared as described above for alkyd resin VI but by replacing 1-phenyl-5-oxopyrrolidine-3-carboxylic acid for an equimolar amount of benzoic acid as component (d).

Polyester-urethane hybrid alkyd resins VIII and B were prepared from alkyd resins VI and VII, respectively, as follows. Isophorone diisocyanate (IPDI) and dimethylol propionic acid (DMPA) in a 1:1 molar ratio were dissolved in MEK and reacted at 75° C. in the presence of triethylamine as catalyst until a content of free isocyanate groups (NCO content) of 4 wt % was achieved. The polyurethane prepolymer thus obtained was cooled to 50° C. and dropwise added to the intermediate alkyd resin. The mixture was then reacted at 75° C. until an NCO content of 0.05 wt % was achieved. Then ethanol was added, and the reaction continued until an NCO content of 0.02 wt %. The solution of polyester-urethane hybrid alkyd resin thus obtained was cooled to room temperature. The solids content of the solution was 70 wt %.

The oil length of alkyd resin VIII was 30%; the oil length of alkyd resin B was 30%.

The content of free isocyanate groups is based on the solid weight and can be determined according to ASTM D2572-19.

Polyester-urethane hybrid alkyd resin VIII is an inventive alkyd resin; polyester-urethane hybrid alkyd resin B is a comparative alkyd resin (no 1-substituted-5-oxopyrrolidine-3-carboxylic acid used).

Example 7—Preparation of Alkyd Emulsions

An alkyd emulsion was prepared from each of alkyd resins VIII and B as follows. An amount of 355 grams of the solution of alkyd resin in MEK was charged to a glass reactor equipped with a triple blade turbine stirrer. Triethylamine was added (0.72 grams) and the reactor was heated to 30° C. while stirring at 300 rpm. Water (463 mL) was dosed for 90 minutes while stirring at 300 rpm. MEK was then removed using a rotary evaporator at 40-50° C. to yield an emulsion with a solids content of 38%.

Example 8—Coating Compositions (Paints)

Base white paints and base clear paints were prepared with the alkyd emulsions VIII and B.

For the base white paints, a titanium dioxide paste was prepared from 30.80 weight parts of titanium dioxide, 1.76 weight parts dispersing agent, 2.34 weight parts propylene glycol, 1.76 weight parts thickener, and 3.76 weight parts water. To the titanium dioxide paste thus prepared were added under stirring, alkyd emulsion, drying catalyst (Borchi OxyCoat), optionally water, wetting agent, surfactant, light absorber, thickener, and coalescing solvent in the weight parts as indicated in Table 8.

For the base clear paints, alkyd emulsion, drying catalyst (Borchi OxyCoat), optionally water, wetting agent, surfactant, light absorber, thickener, and coalescing solvent were mixed in the weight parts as indicated in Table 8.

The hardness (Konig hardness) of coatings formed from the white and clear base paints was determined using the pendulum damping test according to ISO 1522:2006. A glass panel was coated with a 100 μm wet film using a drawdown bar, held at 23° C. and 50% relative humidity and the hardness development in time was monitored with a Konig pendulum. The number of oscillations needed to reduce from an initial deflection of 6° to a deflection of 3° was measured. The average of duplicate measurement was recorded. The Konig hardness was measured after 1 day, after 7 days, and after 28 days storage at 23° C. and 50% relative humidity.

In Table 8, the ingredients and hardness results of the base white paints and base clear paints are shown.

From the results in Table 8, it can be seen that replacement of benzoic acid by a 1-substituted-5-oxopyrrolidine-3-carboxylic acid with a 1-substituent that has a cyclic group results in an polyester-urethane hybrid alkyd that provides a coating with increased hardness.

TABLE 8

Base paints - weight parts of ingredients and hardness

| | BW VIII | BW B* | BC VIII | BC B* |
|---|---|---|---|---|
| Titanium dioxide paste | 39.73 | 39.73 | | |
| Emulsion VIII | 102.89 | | 141.36 | |
| Emulsion B | | 98.25 | | 135 |
| Drying catalyst | 0.11 | 0.11 | 0.15 | 0.15 |
| Water | | 4.46 | 1.76 | 6.87 |
| Thickener | 2.35 | 2.20 | 4.4 | 4.36 |
| Wetting agent | 1.98 | 1.98 | 0.20 | 0.20 |
| Surfactant | 0.3 | 0.3 | 0.30 | 0.30 |
| Light absorber | 1.19 | 1.19 | 1.62 | 1.62 |
| Coalescing solvent | 1.19 | 1.19 | 1.62 | 1.62 |
| König hardness 1 day | 31 | 21 | 47 | 33 |
| König hardness 7 days | 51 | 34 | 67 | 40 |
| König hardness 28 days | 52 | 36 | 68 | 41 |

*comparison example

The invention claimed is:

1. An alkyd resin obtainable by polymerization of reaction components comprising:
   (a) a polybasic acid;
   (b) a polyhydric alcohol;
   (c) an unsaturated fatty acid comprising in the range of from 12 to 24 carbon atoms; and
   (d) optionally a monocarboxylic acid other than the unsaturated fatty acid comprising in the range of from 12 to 24 carbon atoms and other than the polyhydric alcohol,
   wherein at least part of the polybasic acid (a) and/or of the monocarboxylic acid (d) is a 1-substituted-5-oxopyrrolidine-3-carboxylic acid obtainable by reacting itaconic acid with a primary amine group of an amine, wherein the amine comprises an aromatic or non-aromatic cyclic group.

2. The alkyd resin according to claim 1, wherein the reaction components comprise the monocarboxylic acid (d).

3. The alkyd resin according to claim 2, wherein the monocarboxylic acid (d) comprises a 1-substituted-5-oxopyrrolidine-3-carboxylic acid obtainable by reacting itaconic acid with a monoamine comprising a primary amine group and an aromatic or non-aromatic cyclic group.

4. The alkyd resin according to claim 3, wherein the monocarboxylic acid (d) consists of the 1-substituted-5-oxopyrrolidine-3-carboxylic acid.

5. The alkyd resin according to claim 3, wherein the reaction components comprise in the range of from 1 to 40 mol. % of the 1-substituted-5-oxopyrrolidine-3-carboxylic acid, based on the moles of components (a), (b) and (d).

6. The alkyd resin according to claim 1, wherein the polybasic acid (a) comprises a 1-substituted-5-oxopyrrolidine-3-carboxylic acid obtainable by reacting itaconic acid with a polyamine selected from the group consisting of a di-amine and a tri-amine, wherein the di-amine comprises two primary amine groups and an aromatic or non-aromatic cyclic group, and wherein the tri-amine comprises three primary amine groups and an aromatic or non-aromatic cyclic group.

7. The alkyd resin according to claim 6, wherein the polyamine is a di-amine selected from the group consisting of diaminodiphenylalkane and diaminodicyclohexylalkane.

8. The alkyd resin according to claim 6, wherein in the range of from 5 to 40 mol. % of the polybasic acid (a) is the 1-substituted-5-oxopyrrolidine-3-carboxylic acid obtainable by reacting itaconic acid with the di-amine.

9. The alkyd resin according to claim 1, wherein the polybasic acid (a) comprises phthalic acid or phthalic acid anhydride.

10. The alkyd resin according to claim 1, wherein the alkyd resin is a polyurethane-polyester hybrid alkyd resin and wherein the reaction components further comprise (e) a polyurethane prepolymer with emulsifying groups.

11. The alkyd resin according to claim 1, wherein the alkyd resin has an oil length in the range of from 25 to 50%.

12. The alkyd resin according to claim 2, wherein the monocarboxylic acid (d) comprises a 1-substituted-5-oxopyrrolidine-3-carboxylic acid obtainable by reacting itaconic acid with cyclohexylamine or aniline.

13. The alkyd resin according to claim 6, wherein the di-amine is 4,4'-methylenedianiline or 4,4'-methylene bis(4,4'-cyclohexylamine).

14. The alkyd resin according to claim 6, wherein in the range of from 10 to 30 mol. % of the polybasic acid (a) is the 1-substituted-5-oxopyrrolidine-3-carboxylic acid obtainable by reacting itaconic acid with the di-amine.

15. A polyurethane-polyester hybrid alkyd resin obtainable by reacting the alkyd resin according to claim 1 with a polyurethane prepolymer with emulsifying groups.

16. A coating composition comprising the alkyd resin according to claim 1 as binder polymer.

17. The coating composition according to claim 16, wherein the coating composition is an aqueous coating composition comprising the alkyd resin dispersed in an aqueous phase.

18. A substrate coated with the coating composition according to claim 16.

\* \* \* \* \*